United States Patent
Kim et al.

(10) Patent No.: US 10,638,442 B2
(45) Date of Patent: Apr. 28, 2020

(54) METHOD AND APPARATUS FOR ADJUSTING UPLINK TIMING IN A WIRELESS COMMUNICATION SYSTEM

(71) Applicant: LG Electronics Inc., Seoul (KR)

(72) Inventors: Jaehyung Kim, Seoul (KR); Suckchel Yang, Seoul (KR); Seonwook Kim, Seoul (KR); Changhwan Park, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/101,845

(22) Filed: Aug. 13, 2018

(65) Prior Publication Data

US 2019/0082408 A1 Mar. 14, 2019

Related U.S. Application Data

(60) Provisional application No. 62/544,238, filed on Aug. 11, 2017.

(51) Int. Cl.
*H04W 56/00* (2009.01)
*H04W 76/27* (2018.01)
(Continued)

(52) U.S. Cl.
CPC ....... *H04W 56/005* (2013.01); *H04L 27/2607* (2013.01); *H04W 56/001* (2013.01);
(Continued)

(58) Field of Classification Search
CPC ........... H04W 56/005; H04W 72/0453; H04W 74/0841; H04W 72/0446; H04W 76/27;
(Continued)

(56) References Cited

U.S. PATENT DOCUMENTS

2011/0044188 A1  2/2011  Luo et al.
2013/0188473 A1* 7/2013  Dinan ............... H04W 56/0005
                                                  370/216
(Continued)

FOREIGN PATENT DOCUMENTS

KR    20130024895 A  *  3/2013  .......... H04W 52/281
KR    20140111655        9/2014
(Continued)

OTHER PUBLICATIONS

Samsung, R1-1710769, RACH Aspects for CA and DC, 3GPP TSG RAN WG1 NR Ad-Hoc#2, Jun. 16, 2017 See section 2. (Year: 2017).*

(Continued)

*Primary Examiner* — Jackie Zuniga Abad
(74) *Attorney, Agent, or Firm* — Fish & Richardson P.C.

(57) ABSTRACT

A method of adjusting uplink timing in a wireless communication system and an apparatus therefor. A method for a user equipment to adjust uplink timing in a wireless communication system includes transmitting, to a base station, an uplink signal, receiving, from the base station, a timing advance (TA) command configured based on the uplink signal, and performing uplink transmission to the base station by applying a timing advance (TA) indicated by the TA command. The TA command may be interpreted based on subcarrier spacing of at least one frequency resource region to which the TA is to be applied.

11 Claims, 8 Drawing Sheets

(51) Int. Cl.
*H04W 72/04* (2009.01)
*H04W 74/08* (2009.01)
*H04L 27/26* (2006.01)
*H04L 5/00* (2006.01)
*H04W 80/02* (2009.01)
*H04W 74/00* (2009.01)

(52) U.S. Cl.
CPC ... *H04W 72/0446* (2013.01); *H04W 72/0453* (2013.01); *H04W 74/0841* (2013.01); *H04W 76/27* (2018.02); *H04L 5/001* (2013.01); *H04L 5/0053* (2013.01); *H04W 74/006* (2013.01); *H04W 80/02* (2013.01)

(58) Field of Classification Search
CPC ............... H04W 56/001; H04W 80/02; H04L 27/2607; H04L 5/001
See application file for complete search history.

(56) References Cited

U.S. PATENT DOCUMENTS

2015/0003427 A1* 1/2015 Wan ................. H04W 74/0891
370/336
2017/0164350 A1 6/2017 Sun et al.

FOREIGN PATENT DOCUMENTS

| KR | 20140130164 | 11/2014 | |
|----|----|----|----|
| KR | 1020170004061 | 1/2017 | |
| WO | WO-2013112773 A1 * | 8/2013 | ........ H04W 56/0005 |
| WO | WO2016144903 | 9/2016 | |

OTHER PUBLICATIONS

Huawei, HiSilicon, "Initial access in NR," R2-163923, 3GPP TSG-RAN WG2 Meeting #94, Nanjing, China, dated May 14, 2016, 6 pages.

* cited by examiner (a)

(b)

(c)

(d)

(e)

☐ F1  ▨ F2

METHOD AND APPARATUS FOR ADJUSTING UPLINK TIMING IN A WIRELESS COMMUNICATION SYSTEM

CROSS-REFERENCE TO RELATED APPLICATION

Pursuant to 35 U.S.C. § 119(a), this application claims the benefit of earlier filing date and right of priority to U.S. Provisional Application No. 62/544,238, filed on Aug. 11, 2017. The contents of which are incorporated by reference herein in their entirety.

BACKGROUND OF THE INVENTION

Field of the Invention

The present invention relates to a wireless communication system and, more particularly, to a method of adjusting uplink timing and an apparatus supporting the same.

Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY OF THE INVENTION

This specification proposes a method of adjusting uplink timing in a wireless communication system and an apparatus therefor.

This specification proposes a method of obtaining information about timing advance (TA) and a timing advance group (TAG) and an apparatus therefor. Furthermore, this specification a method of configuring a TA command and an apparatus therefor.

It is to be understood that technical objects to be achieved by the present invention are not limited to the aforementioned technical object and other technical objects which are not mentioned herein will be apparent from the following description to one of ordinary skill in the art to which the present invention pertains.

A method for adjusting uplink timing in a wireless communication system according to an embodiment of the present invention is performed by a user equipment and includes transmitting, to a base station, an uplink signal, receiving, from the base station, a timing advance (TA) command configured based on the uplink signal, and performing uplink transmission to the base station by applying a timing advance (TA) indicated by the TA command, wherein the TA command may be interpreted based on subcarrier spacing of at least one frequency resource region to which the TA is to be applied.

Furthermore, the method according to an embodiment of the present invention further includes receiving, from the base station, information for a timing advance group (TAG). The TA command may be a TA command corresponding to the TAG.

Furthermore, in the method according to an embodiment of the present invention, the uplink signal may be a preamble for random access to the base station, and the TA command may be included in a random access response transmitted by the base station as a response to the preamble.

Furthermore, in the method according to an embodiment of the present invention, when the TA is applied for the update of previously configured uplink timing, the TA command may be received through a medium access control-control element (MAC-CE). In this case, a radio resource control connection may have been set up in the user equipment. The uplink signal may be at least one of a physical uplink control channel, a physical uplink shared channel and a sounding reference signal.

Furthermore, in the method according to an embodiment of the present invention, the TA command may be configured based on the largest subcarrier spacing of subcarrier spacings of frequency resource regions configuring the TAG.

Furthermore, in the method according to an embodiment of the present invention, a maximum TA value indicated by the TA command may be configured based on a minimum subcarrier spacing of subcarrier spacings of frequency resource regions configuring the TAG. In this case, the field size of the TA command may be configured based on a minimum subcarrier spacing of the subcarrier spacings of the frequency resource regions configuring the TAG.

Furthermore, in the method according to an embodiment of the present invention, an offset between reception timing of the TA command and timing of the uplink transmission may be configured in a slot unit according to the subcarrier spacing.

A user equipment for adjusting uplink timing in a wireless communication system according to an embodiment of the present invention includes a radio frequency (RF) module for transmitting and receiving radio signals and a processor functionally connected to the RF module. The processor may control to transmit, to a base station, an uplink signal, receive, from the base station, a timing advance (TA) command configured based on the uplink signal, and perform uplink transmission to the base station by applying a timing advance (TA) indicated by the TA command. The TA command may be interpreted based on subcarrier spacing of at least one frequency resource region to which the TA is to be applied.

Furthermore, in the user equipment according to an embodiment of the present invention, the processor may control to receive, from the base station, information for a timing advance group (TAG). The TA command may be a TA command corresponding to the TAG.

Furthermore, in the user equipment according to an embodiment of the present invention, the uplink signal may be a preamble for random access to the base station, and the TA command may be included in a random access response transmitted by the base station as a response to the preamble.

Furthermore, in the user equipment according to an embodiment of the present invention, when the TA is applied for the update of previously configured uplink timing, the TA command may be received through a medium access control-control element (MAC-CE).

Furthermore, in the user equipment according to an embodiment of the present invention, the TA command may be configured based on the largest subcarrier spacing of subcarrier spacings of frequency resource regions configuring the TAG.

Furthermore, in the user equipment according to an embodiment of the present invention, a maximum TA value indicated by the TA command may be configured based on a minimum subcarrier spacing of subcarrier spacings of frequency resource regions configuring the TAG.

BRIEF DESCRIPTION OF THE DRAWINGS

The accompanying drawings, which are included herein as a part of a description in order to help understanding of the present disclosure, provide embodiments of the present disclosure, and describe the technical features of the present disclosure with the description below.

DESCRIPTION OF EXEMPLARY EMBODIMENTS

Figure 1:
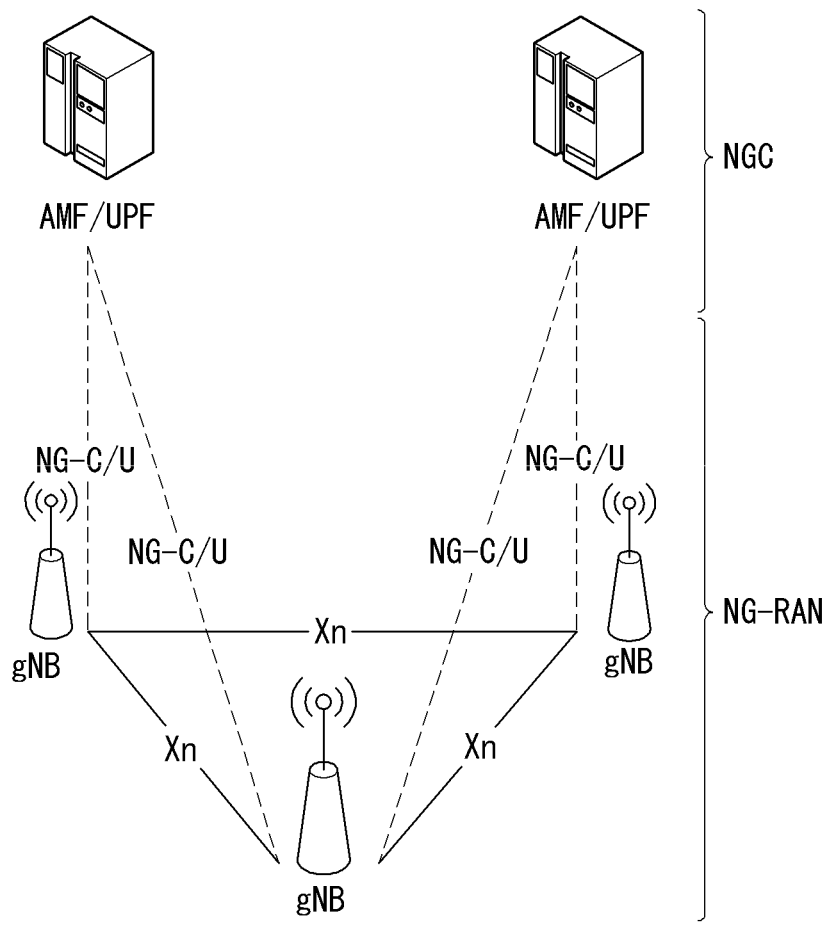
FIG. 1 is a diagram illustrating an example of an overall structure of a new radio (NR) system to which a method proposed by the present disclosure may be implemented.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or next generation NB (general NB, gNodeB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Furthermore, a 5G new radio (NR) defines an enhanced mobile broadband (eMBB), massive machine type communications (mMTC), ultra-reliable and low latency communications (URLLC), and vehicle-to-everything (V2X) based on a usage scenario.

Furthermore, the 5G NR standard is divided into standalone (SA) and non-standalone (NSA) based on co-existence between the NR system and the LTE system.

Furthermore, the 5G NR supports various subcarrier spacings, and supports CP-OFDM in the downlink and supports CP-OFDM and DFT-s-OFDM (SC-OFDM) in the uplink.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT (NR) is chiefly described, but the technical characteristics of the present disclosure are not limited thereto.

Definition of terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC.

Non-standalone E-UTRA: A deployment configuration an eLTE eNB requires a gNB as an anchor for a control plane connection to an NGC.

User plane gateway: A terminal point of NG-U interface

General system

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and frame structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $Ts=(\Delta f_{max} N_f/1000) \cdot T_s=1$ ms. In this case, there may be a set of UL frames and a set of DL frames.

Figure 2:
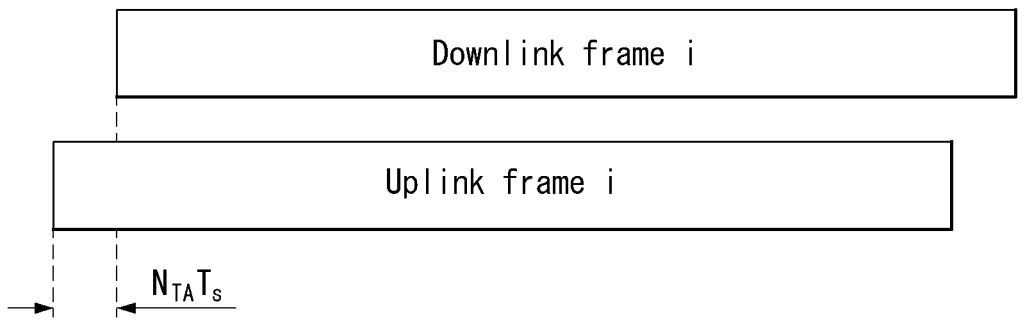
FIG. 2 illustrates a relationship between a uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology $\mu$, slots are numbered in ascending order of $n_s^\mu \in \{0, \ldots, N_{subframe}^{slots,\mu}-1\}$ in a subframe, and in ascending order of $N_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR physical resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
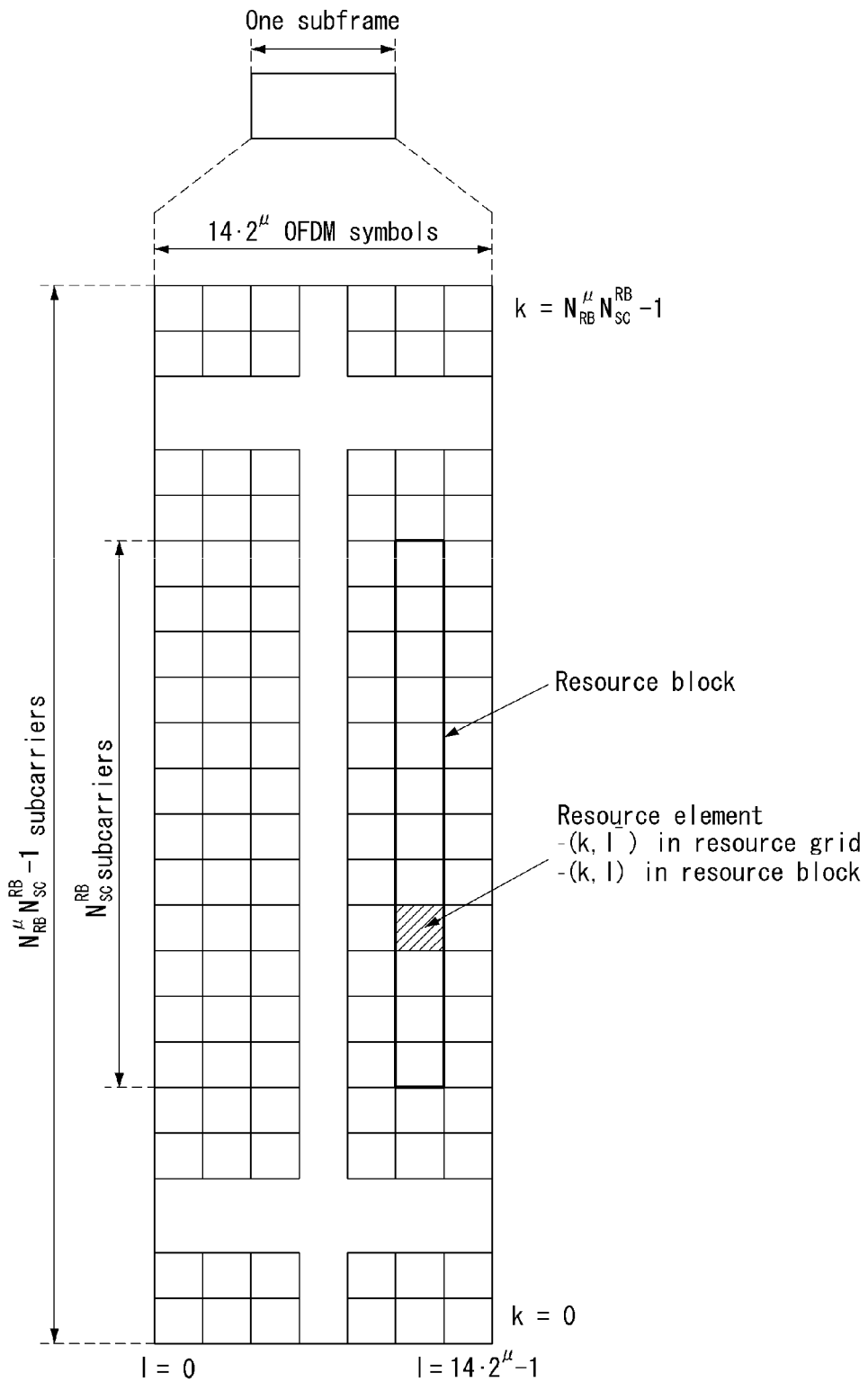
FIG. 3 illustrates an example of a resource grid supported in a wireless communication system to which a method proposed by the present disclosure may be implemented.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of 14·2$\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 4:
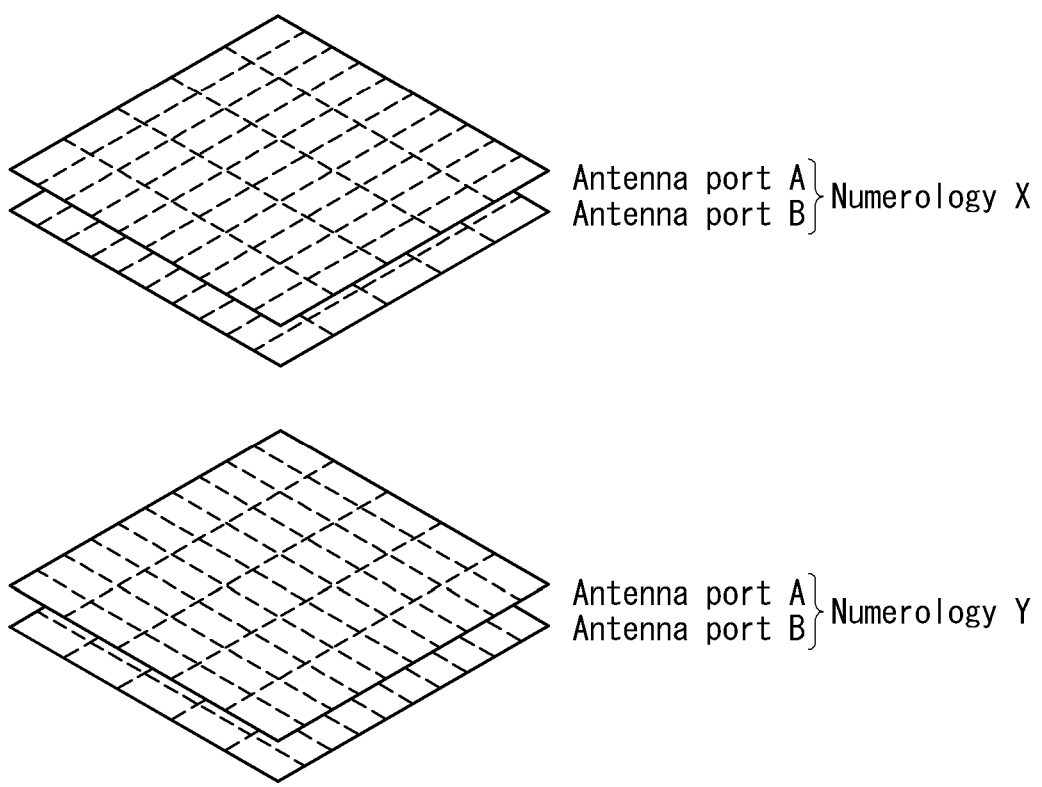
FIG. 4 illustrates examples of resource grids for each antenna port and numerology to which a method proposed in this specification may be applied.

In this case, as illustrated in FIG. 4, one resource grid may be configured for the numerology $\mu$ and an antenna port p.

FIG. 4 illustrates examples of resource grids for each antenna port and numerology to which a method proposed in this specification may be applied.

Each element of the resource grid for the numerology $\mu$ and the antenna port p is indicated as a resource element, and may be uniquely identified by an index pair (k,l̄). Herein, k=0, ..., $N_{RB}^{\mu} N_{sc}^{RB}$−1 is an index in the frequency domain, and l̄=0 ..., $2^{\mu} N_{symb}^{(\mu)}$−1 indicates a location of a symbol in a subframe. To indicate a resource element in a slot, the index pair (k,l) is used. Herein, l=0, ..., $N_{symb}^{\mu}$−1.

The resource element (k,l̄) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{sc}^{RB}$=12 continuous subcarriers in the frequency domain. In the frequency domain, physical resource blocks may be numbered from 0 to $N_{RB}^{\mu}$−1. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}$−1 in the frequency region.

Self-contained slot structure

Figure 5:
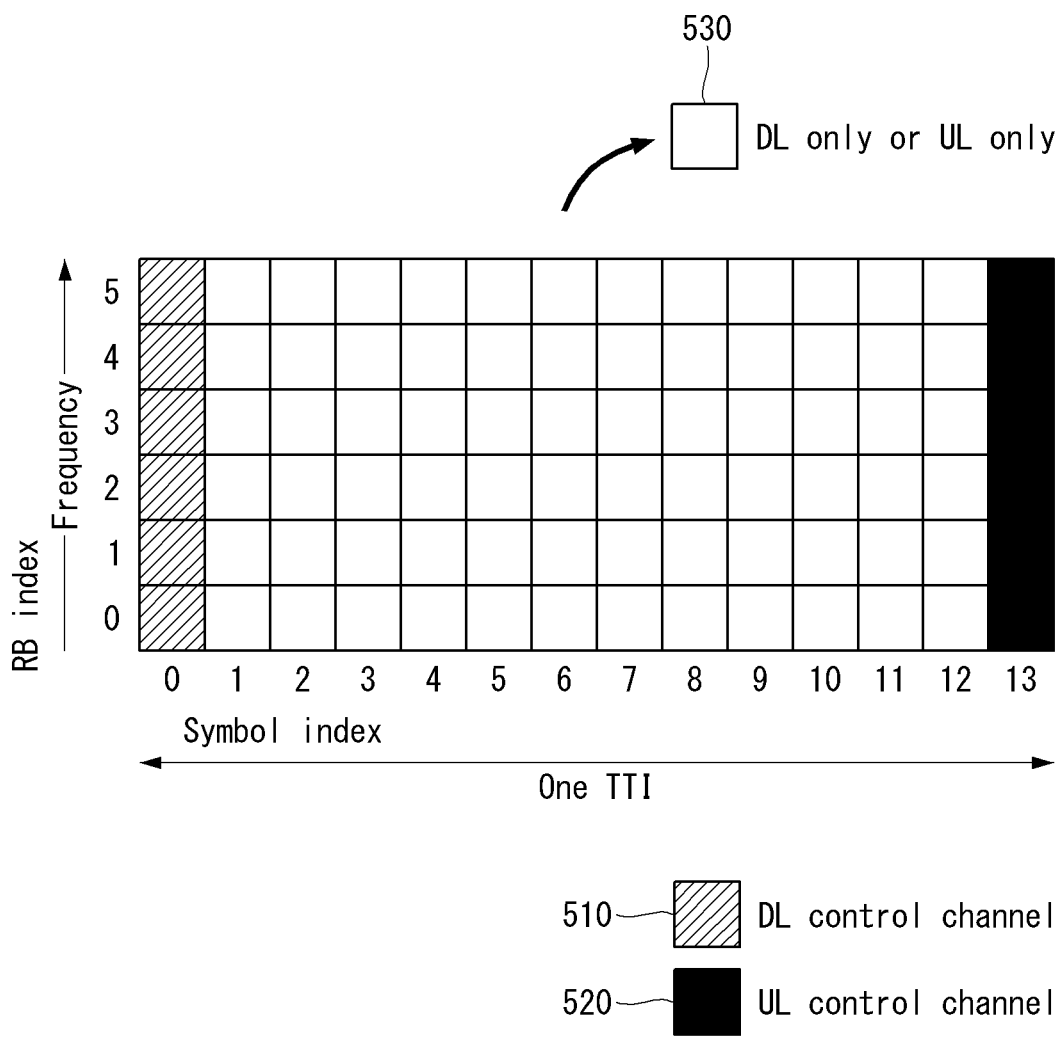
FIG. 5 is a diagram illustrating an example of a self-contained subframe structure in a wireless communication system to which the present disclosure may be implemented.

In order to minimize latency of data transmission in the TDD system, in a 5G New RAT (NR), a self-contained slot structure such as FIG. 5 may be taken into consideration.

That is, FIG. 5 is a diagram showing an example of a self-contained slot structure to which a method proposed in this specification may be applied.

In FIG. 5, a deviant crease line area 510 indicates a downlink (DL) control region and a black portion 520 indicates an uplink (UL) control region.

A portion 530 not having indication may be used for downlink data transmission or uplink data transmission.

The characteristic of such a structure is that DL transmission and UL transmission are sequentially performed within one slot and DL data can be transmitted and UL Ack/Nack can also be transmitted and received within one slot.

Such a slot may be defined as a "self-contained slot."

That is, through such a slot structure, a base station can reduce the time taken to perform data retransmission to a UE when a data transmission error occurs and thus can minimize latency of the final data delivery.

In such a self-contained slot structure, a base station and a UE require a time gap for a process of switching from a transmission mode to a reception mode or a process of switching from the reception mode to the transmission mode.

To this end, in a corresponding slot structure, some OFDM symbols when DL switches to UL are configured as a guard period (GP).

Carrier aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, a multi-carrier means an aggregation of carriers (alternatively carrier aggregation). In this case, the aggregation of carriers means both an aggregation between continuous carriers and an aggregation between non-contiguous carriers. Further, the number of component carriers aggregated between downlink and uplink may be differently set. A case where the number of downlink component carriers (hereinafter referred to as a "DL CC") and the number of uplink component carriers (hereinafter, referred to as an "UL CC") are the same is referred to as a "symmetric aggregation", and a case where the number of downlink component carriers and the number of uplink component carriers are different is referred to as an "asymmetric aggregation." The carrier aggregation may be used interchangeably with a term, such as a bandwidth aggregation or a spectrum aggregation.

A carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell or S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively a primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 6:
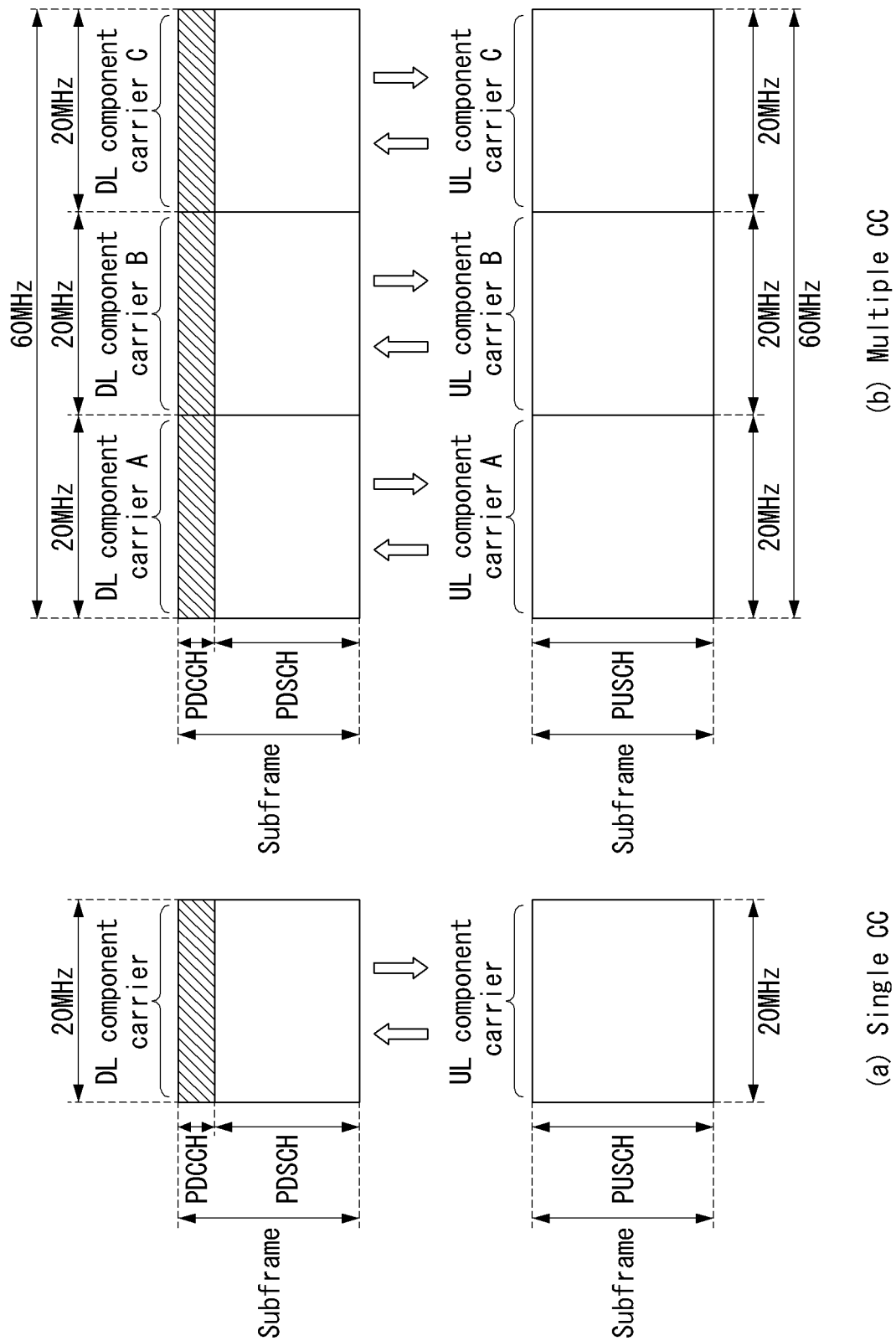
FIG. 6 illustrates an example of component carriers and carrier aggregations in a wireless communication system to which the present invention may be applied.

FIG. 6 illustrates examples of a component carrier and carrier aggregation in the wireless communication system to which the present invention can be applied.

FIG. 6(a) illustrates a single carrier structure used in an LTE system. The component carrier includes the DL CC and the UL CC. One component carrier may have a frequency range of 20 MHz.

FIG. 6(b) illustrates a carrier aggregation structure used in the LTE system. In the case of FIG. 6(b), a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

If one or more S cells are configured in a UE, a network may activate or deactivate the configured S cell(s). A P cell is always activated. The network activates or deactivates the S cell(s) by sending an activation/deactivation MAC control element.

The activation/deactivation MAC control element has a fixed size and includes a single octet including seven C fields and one R field. The C field is configured for each S cell index "SCellIndex", and indicates the activation/deactivation state of the S cell. When the value of the C field is set to "1", it indicates that an S cell having a corresponding S cell index is activated. When the value of the C field is set to "0", it indicates that an S cell having a corresponding S cell index is deactivated.

Furthermore, the UE maintains a timer "sCellDeactivationTimer" for each configured S cell and deactivates a related S cell when the timer expires. The same initial value of the timer is applied to each instance of the timer "sCellDeactivationTimer" and set by RRC signaling. When the S cell(s) are added or after handover, initial S cell(s) are a deactivation state.

The UE performs the following operation on each of the configured S cell(s) in each TTI.

When the UE receives an activation/deactivation MAC control element that activates an S cell in a specific TTI (subframe n), the UE activates the S cell in a corresponding TTI (a subframe n+8 or thereafter) on predetermined timing and (re)starts a timer related to the corresponding S cell. What the UE activates the S cell means that the UE applies a common S cell operation, such as the transmission of a sounding reference signal (SRS), the reporting of a channel quality indicator (CQI)/precoding matrix indicator (PMI)/rank indication (RI)/precoding type indicator (PTI), the monitoring of a PDCCH and the monitoring of a PDCCH for an S cell on the S cell.

When the UE receives an activation/deactivation MAC control element that deactivates an S cell in a specific TTI (subframe n) or a timer related to a specific TTI (subframe n)-activated S cell expires, the UE deactivates the S cell in a corresponding TTI (subframe n+8 or thereafter) on predetermined timing, stops the timer of the corresponding S cell, and flushes all of HARQ buffers related to the corresponding S cell.

If a PDCCH on an activated S cell indicates an uplink grant or downlink assignment or a PDCCH on a serving cell that schedules the activated S cell indicates an uplink grant or downlink assignment for the activated S cell, the UE restarts a timer related to the corresponding S cell.

When the S cell is deactivated, the UE does not send an SRS on the S cell, does not report a CQI/PMI/RI/PTI for the S cell, does not send an UL-SCH on the S cell, and does not monitor a PDCCH on the S cell.

The contents of the aforementioned carrier aggregation have been described based on the LTE/LTE-A system and are for convenience of description and may be extended and applied to the 5G NR system in the same or similar manner. In particular, carrier aggregation deployment scenarios that may be taken into consideration in the 5G NR system may be the same as FIG. 7.

Figure 7:
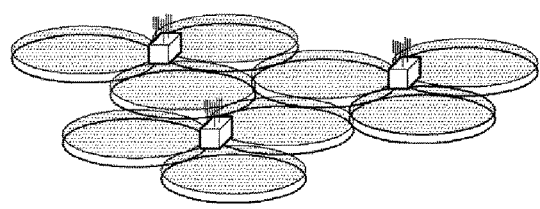
FIG. 7 illustrates examples of deployment scenarios into which carrier aggregations in an NR system are taken into consideration.
Figure 7:
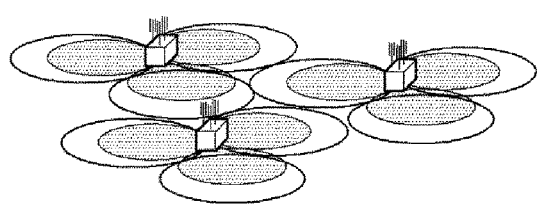
Figure 7:
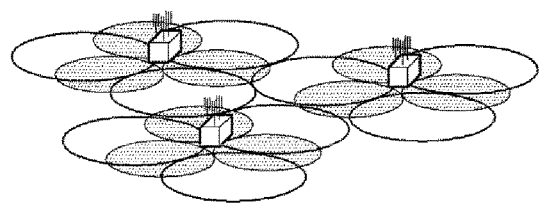
Figure 7:
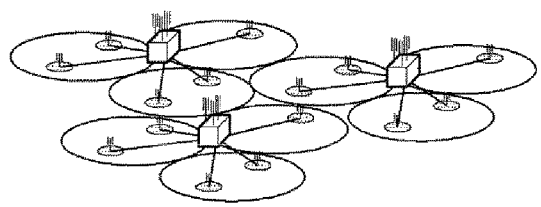
Figure 7:
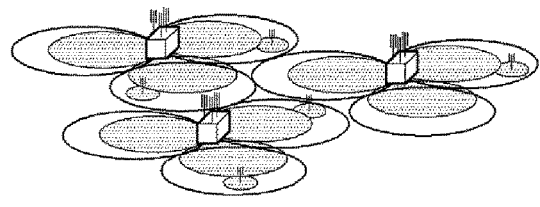

FIG. 7 illustrates examples of deployment scenarios into which carrier aggregations in an NR system are taken into consideration.

Referring to FIG. 7, F1 and F2 may mean a cell configured as a first frequency (or a first frequency band, a first carrier frequency or a first center frequency) and a cell configured as a second frequency (or a second frequency band, a second carrier frequency or a second center frequency).

FIG. 7(a) illustrates a first CA deployment scenario. As shown in FIG. 7(a), the F1 cell and the F2 cell may be co-located (or overlaid). In this case, both the two layers may provide sufficient coverage and mobility in the two layers may be supported. The first CA deployment scenario may include a case where the F1 cell and the F2 cell are present in the same band. In the first CA deployment scenario, it may be expected that an aggregation may be possible between the overlaid F1 cell and F2 cell.

FIG. 7(b) illustrates a second CA deployment scenario. As shown in FIG. 7(b), the F1 cell and the F2 cell may be co-located (or overlaid), but the F2 cell may support smaller coverage due to a greater path loss. In this case, only the F1 cell provides sufficient coverage, and the F2 cell may be used to improve throughput. In this case, mobility may be performed based on the coverage of the F1 cell. The second CA deployment scenario may include a case where the F1 cell and the F2 cell are present in different bands (e.g., the F1 cell is present in {800 MHz, 2 GHz} and the F2 cell is present in {3.5 GHz}). In the second CA deployment scenario, it may be expected that an aggregation may be possible between the overlaid F1 cell and F2 cell.

FIG. 7(c) illustrates a third CA deployment scenario. As shown in FIG. 7(c), the F1 cell and the F2 cell are co-located (or overlaid), but the antenna of the F2 cell may be connected to the boundary of the F2 cell in order to increase throughput at a cell edge. In this case, the F1 cell provides sufficient coverage, but the F2 cell may have a hole attributable to a potentially greater path loss. In this case, mobility may be performed based on the coverage of the F1 cell. The third CA deployment scenario may include a case where the F1 cell and the F2 cell are present in different bands (e.g., the F1 cell is present in {800 MHz, 2 GHz} and the F2 cell is present in {3.5 GHz}). In the third CA deployment scenario, it may be expected that an aggregation may be possible in the area where coverage between the F1 cell and F2 cell of the same base station.

FIG. 7(d) illustrates a fourth CA deployment scenario. As shown in FIG. 7(d), the F1 cell provides macro coverage, and F2 remote radio heads (RRHs) may be used to improve throughput in a hot spot. In this case, mobility may be performed based on the coverage of the F1 cell. The fourth CA deployment scenario may include both a case where the F1 cell and the F2 cell correspond to a DL non-contiguous carrier in the same band (e.g., 1.7 GHz) and a case where the F1 cell and the F2 cell are present in different bands (e.g., the F1 cell is present in {800 MHz, 2 GHz} and the F2 cell is present in {3.5 GHz}). In the fourth CA deployment scenario, it may be expected that an aggregation may be possible between the F2 cells (i.e., RRHs) and the F1 cell(s) (i.e., macro cell(s)) underlying the F2 cells.

FIG. 7(e) illustrates a fifth CA deployment scenario. The fifth CA deployment scenario is similar to the second CA deployment scenario, but frequency selective repeaters may be disposed so that coverage for one of carrier frequencies can be extended. In the fifth CA deployment scenario, it may be expected that an aggregation may be possible in the area where coverage is overlaid between the F1 cell and F2 cell of the same base station.

A reception timing difference in the physical layer of UL grants and DL assignments for the same TTI (e.g., dependent on the number of control symbols, propagation, and a deployment scenario), although it is caused by different serving cells, may not affect a MAC operation. A UE may need to process a relative propagation delay difference up to 30 us from among CCs to be aggregated in both an intra-band discontiguous CA and an inter-band discontiguous CS. This may mean that the UE needs to process delay spread up to 30.26 us from among CCs monitored in a receiver because the time alignment of a base station is specified as a maximum of 0.26 us. Furthermore, this may mean that a UE must process a maximum uplink transmission timing difference between TAGs of 36.37 us with respect to an inter-band CA having multiple TAGs.

If a CA is deployed, frame timing and a system frame number (SFN) may be aligned over aggregated cells.

Random access procedure

A random access procedure provided by LTE/LTE-A systems is described below.

The random access procedure is used for a UE to obtain uplink synchronization with an eNB or to have uplink radio resources allocated thereto. When the UE is powered on, the UE obtains downlink synchronization with an initial cell and receives system information. The UE obtains information about a set of available random access preambles and radio resources used to send a random access preamble from the system information. The radio resources used to send the random access preamble may be specified as a combination of at least one subframe index and an index in a frequency domain. The UE sends a random access preamble randomly selected from the set of random access preambles. An eNB that has received the random access preamble sends a timing alignment (TA) value for uplink synchronization to the UE through a random access response. Accordingly, the UE obtains uplink synchronization.

The random access procedure is common to frequency division duplex (FDD) and time division duplex (TDD). The random access procedure is not related to a cell size and is also not related to the number of serving cells if a component aggregation (CA) has been configured.

First, the UE may perform the random access procedure as in the following cases.

In a case that the UE performs initial access in the RRC idle state because it does not have RRC connection with the eNB In a case that the UE performs an RRC connection re-establishment procedure In a case that the UE first accesses a target cell in a handover procedure In a case that the random access procedure is requested by a command from the eNB In a case that there is data to be transmitted in downlink in an uplink non-synchronized situation during the RRC connection state In a case that there is a data to be transmitted in uplink in an uplink non-synchronized situation or in a situation in which designated radio resources used to request radio resources have not been allocated during the RRC connection state In a case that the positioning of the UE is performed in a situation in which timing advance is necessary during the RRC connection state In a case that a recovery process is performed when a radio link failure or handover failure occurs In 3GPP Rel-10, a method for applying a timing advance (TA) value applicable to one specific cell (e.g., a P cell) to a plurality of cells in common in a radio access system supporting a component aggregation has been taken into consideration. A UE may aggregate a plurality of cells belonging to different frequency bands (i.e., greatly spaced apart on the frequency) or a plurality of cells having different propagation properties. Furthermore, in the case of a specific cell, in order to expand coverage or remove a coverage hole, if the UE performs communication with an eNB (i.e., a macro eNB) through one cell and performs communication with a secondary eNB (SeNB) through the other cell in a situation in which a remote radio header (RRH) (i.e., repeater), a small cell such as a femto cell or a pico cell, or the SeNB has been disposed within the cell, a plurality of cells may have different delay properties. In this case, if the UE performs uplink transmission using a method for applying one TA value to a plurality of cells in common, the synchronization of an uplink signal transmitted on the plurality of cells may be severely influenced. Accordingly, a plurality of TAs may be used in a CA situation in which a plurality of cells has been aggregated. In 3GPP Rel-11, in order to support multiple TAs, the independent allocation of the TAs may be taken into consideration for each specific cell group. This is called a TA group (TAG). The TAG may include one or more cells. The same TA may be applied to one or more cells included in a TAG in common. In order to support such multiple TAs, an MAC TA command control element includes a TAG identity (ID) of 2 bits and a TA command field of 6 bits.

A UE in which a CA has been configured performs a random access procedure if it performs the random access procedure in relation to a P cell. In the case of a TAG to which the P cell belongs (i.e., a primary TAG (pTAG)), as in a conventional technology, TA determined based on the P cell or coordinated through a random access procedure involved in the P cell may be applied to all of cell(s) within the pTAG. In contrast, in the case of a TAG including only an S cell (i.e., a secondary TAG (sTAG)), TA determined based on a specific S cell within the sTAG may be applied to all of cell(s) within the corresponding sTAG. In this case, the TA may be obtained by a random access procedure initiated by an eNB. More specifically, the S cell is configured as a random access channel (RACH) resource within the sTAG. In order to determine the TA, the eNB requests RACH access in the S cell. That is, the eNB initiates RACH transmission on S cells in response to a PDCCH order transmitted in the P cell. A response message for an S cell preamble is transmitted through a P cell using an RA-RNTI. The UE may apply TA, determined based on an S cell to which random access has been successfully completed, to all of cell(s) within a corresponding sTAG. As described above, the random access procedure may be performed even in an S cell in order to obtain the TA of an sTAG to which the S cell belongs even in the corresponding S cell.

An LTE/LTE-A system provides a contention-based random access procedure for randomly selecting, by a UE, one preamble within a specific set and using the selected preamble and a non-contention-based random access procedure for using a random access preamble allocated to only a specific UE by an eNB in a process of selecting a random access preamble (RACH preamble). In this case, the non-contention-based random access procedure may be used for only UE positioning and/or timing advance alignment for an sTAG if it is requested in the handover process or in response to a command from the eNB. After the random access procedure is completed, common uplink/downlink transmission is performed.

A relay node (RN) also supports both the contention-based random access procedure and the non-contention-based random access procedure. When a relay node performs the random access procedure, it suspends an RN subframe configuration at that point of time. That is, this means that it temporarily discards an RN subframe. Thereafter, an RN subframe configuration is restarted at a point of time at which a random access procedure is successfully completed.

Figure 8:
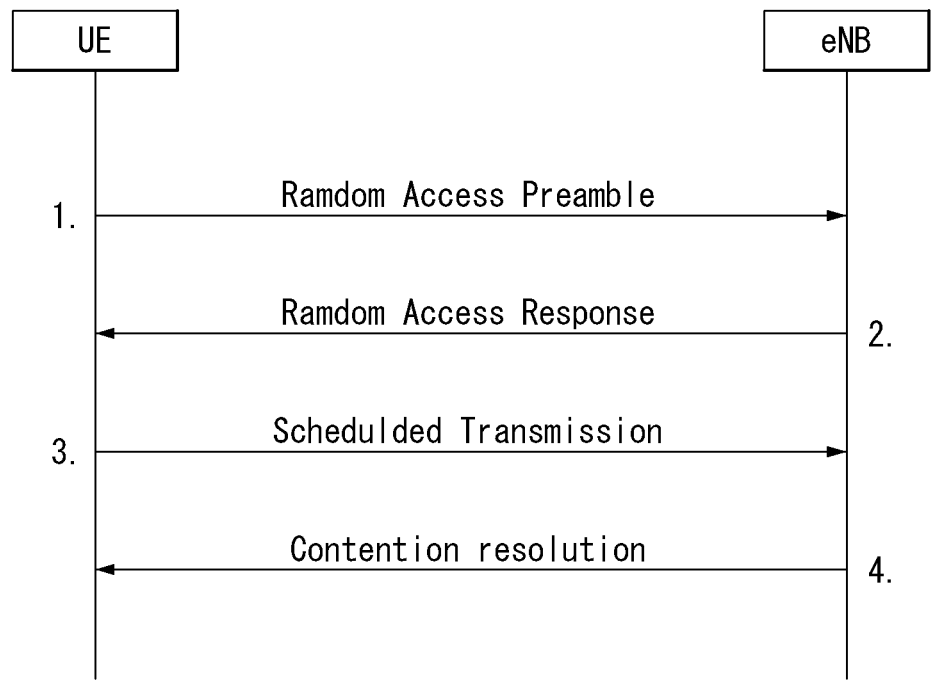
FIG. 8 is a diagram for illustrating a contention-based random access procedure in a wireless communication system to which the present invention may be applied.

FIG. 8 is a diagram for illustrating a contention-based random access procedure in a wireless communication system to which an embodiment of the present invention may be applied.

(1) First Message (Msg 1 or Message 1)

First, a UE randomly selects one random access preamble (RACH preamble) from a set of random access preambles indicated by system information or a handover command, selects a physical RACH (PRACH) resource capable of sending the random access preamble, and sends the selected physical RACH (PRACH).

The random access preamble is transmitted through 6 bits in an RACH transport channel. The 6 bits include a random identity of 5 bits for identifying the UE that has performed RACH transmission and 1 bit (e.g., indicate the size of a third message Msg3) for indicating additional information.

An eNB that has received the random access preamble from the UE decodes the random access preamble and obtains an RA-RNTI. The RA-RNTI related to the PRACH in which the random access preamble has been transmitted is determined by the time-frequency resource of the random access preamble transmitted by the corresponding UE.

(2) Second Message (Msg 2 or Message 2)

The eNB sends a random access response, addressed by the RA-RNTI obtained through the preamble on the first message, to the UE. The random access response may include a random access (RA) preamble index/identifier, uplink (UL) assignment providing notification of uplink radio resources, a temporary C-RNTI, and a time alignment command (TAC). The TAC is information indicative of a time alignment command that is transmitted from the eNB to the UE in order to maintain uplink time alignment. The UE updates uplink transmission timing using the TAC. When the UE updates time synchronization, it initiates or restarts a time alignment timer. An UL grant includes uplink resource allocation used for the transmission of a scheduling message (third message) to be described later and a transmit power command (TPC). The TPC is used to determine transmission power for a scheduled PUSCH.

After the UE sends the random access preamble, it attempts to receive its own random access response within a random access response window indicated by the eNB through system information or a handover command, detects a PDCCH masked with an RA-RNTI corresponding to the PRACH, and receives a PDSCH indicated by the detected PDCCH. Information about the random access response may be transmitted in the form of a MAC packet data unit (PDU). The MAC PDU may be transferred through the PDSCH. The PDCCH may include information about the UE that needs to receive the PDSCH, information about the frequency and time of the radio resources of the PDSCH, and the transmission format of the PDSCH. As described above, once the UE successfully detects the PDCCH transmitted thereto, it may properly receive the random access response transmitted through the PDSCH based on the pieces of information of the PDCCH.

The random access response window means a maximum time interval during which the UE that has sent the preamble waits to receive the random access response message. The random access response window has a length of "ra-ResponseWindowSize" that starts from a subframe subsequent to three subframes from the last subframe in which the preamble is transmitted. That is, the UE waits to receive the random access response during a random access window secured after three subframes from a subframe in which the preamble has been transmitted. The UE may obtain the parameter value of a random access window size "ra-ResponseWindowsize" through the system information. The random access window size may be determined to be a value between 2 and 10.

When the UE successfully receives the random access response having the same random access preamble index/ identifier as the random access preamble transmitted to the eNB, it suspends the monitoring of the random access response. In contrast, if the UE has not received a random access response message until the random access response window is terminated or the UE does not receive a valid random access response having the same random access preamble index as the random access preamble transmitted to the eNB, the UE considers the reception of a random access response to be a failure and then may perform preamble retransmission.

As described above, the reason why the random access preamble index is necessary for the random access response is to provide notification that an UL grant, a TC-RNTI and a TAC are valid for which UE because random access response information for one or more UEs may be included in one random access response.

(3) Third Message (Msg 3 or Message 3)

When the UE receives a valid random access response, it processes each of pieces of information included in the random access response. That is, the UE applies a TAC to each of the pieces of information and stores a TC-RNTI. Furthermore, the UE sends data, stored in the buffer of the UE, or newly generated data to the eNB using an UL grant. If the UE performs first connection, an RRC connection request generated in the RRC layer and transferred through a CCCH may be included in the third message and transmitted. In the case of an RRC connection re-establishment procedure, an RRC connection re-establishment request generated in the RRC layer and transferred through a CCCH may be included in the third message and transmitted. Furthermore, the third message may include an NAS access request message.

The third message may include the identity of the UE. In the contention-based random access procedure, the eNB is unable to determine which UE can perform the random access procedure. The reason for this is that the UE has to be identified in order to perform a collision resolution.

A method for including the identity of UE includes two methods. In the first method, if UE has already had a valid cell identity (C-RNTI) allocated in a corresponding cell prior to a random access procedure, the UE sends its own cell identity through an uplink transmission signal corresponding to an UL grant. In contrast, if a valid cell identity has not been allocated to the UE prior to a random access procedure, the UE includes its own unique identity (e.g., an S-TMSI or a random number) in an uplink transmission signal and sends the uplink transmission signal. In general, the unique identity is longer than a C-RNTI. In transmission on an UL-SCH, UE-specific scrambling is used. In this case, if a C-RNTI has not been allocated to the UE, the scrambling may not be based on the C-RNTI, and instead a TC-RNTI received in a random access response is used. If the UE has sent data corresponding to the UL grant, it initiates a timer for a collision resolution (i.e., a contention resolution timer).

(4) Fourth Message (Msg 4 or Message 4)

When the C-RNTI of the UE is received through the third message from the UE, the eNB sends a fourth message to the UE using the received C-RNTI. In contrast, when the eNB receives a unique identity (i.e., an S-TMSI or a random number) through the third message from the UE, it sends the fourth message to the UE using a TC-RNTI allocated to the corresponding UE in a random access response. In this case, the fourth message may correspond to an RRC connection setup message including a C-RNTI.

After the UE sends data including its own identity through the UL grant included in the random access response, it waits for an instruction from the eNB for a collision resolution. That is, the UE attempts to receive a PDCCH in order to receive a specific message. A method for receiving the PDCCH includes two methods. As described above, if the third message transmitted in response to the UL grant includes a C-RNTI as its own identity, the UE attempts the reception of a PDCCH using its own C-RNTI. If the identity is a unique identity (i.e., an S-TMSI or a random number), the UE attempts the reception of a PDCCH using a TC-RNTI included in the random access response. Thereafter, in the former case, if the UE has received a PDCCH through its own C-RNTI before a collision resolution timer expires, the UE determines that the random access procedure has been normally performed and terminates the random access procedure. In the latter case, if the UE has received a PDCCH through a TC-RNTI before a collision resolution timer expires, the UE checks data in which a PDSCH indicated by the PDCCH is transferred. If, as a result of the check, it is found that the unique identity of the UE has been included in the contents of the data, the UE determines that the random access procedure has been normally performed and terminates the random access procedure. The UE obtains the C-RNTI through the fourth message. Thereafter, the UE and a network send or receive a UE-dedicated message using the C-RNTI.

A method for a collision resolution in random access is described below.

The reason why a collision occurs in performing random access is that the number of random access preambles is basically limited. That is, a UE randomly selects one of common random access preambles and sends the selected random access preamble because an eNB cannot assign a random access preamble unique to a UE to all of UEs. Accordingly, two or more UEs may select the same random access preamble and send it through the same radio resources (PRACH resource), but the eNB determines the received random access preambles to be one random access preamble transmitted by one UE. For this reason, the eNB sends a random access response to the UE, and expects that the random access response will be received by one UE. As described above, however, since a collision may occur, two or more UEs receive one random access response and thus the eNB performs an operation according to the reception of each random access response for each UE. That is, there is a problem in that the two or more UEs send different data through the same radio resources using one UL grant included in the random access response. Accordingly, the transmission of the data may all fail, and the eNB may receive only the data of a specific UE depending on the location or transmission power of the UEs. In the latter case, all of the two or more UEs assume that the transmission of their data was successful, and thus the eNB has to notify UEs that have failed in the contention of information about the failure. That is, providing notification of information about the failure or success of the contention is called a collision resolution.

A collision resolution method includes two methods. One method is a method using a collision resolution timer, and the other method is a method of sending the identity of a UE that was successful in a contention to other UEs. The former method is used when a UE already has a unique C-RNTI prior to a random access process. That is, the UE that has already had the C-RNTI sends data, including its own C-RNTI, to an eNB in response to a random access response, and drives a collision resolution timer. Furthermore, when PDCCH information indicated by its own C-RNTI is received before the collision resolution timer expires, the UE determines that it was successful in the contention and normally terminates the random access. In contrast, if the UE does not receive a PDCCH indicated by its own C-RNTI before the collision resolution timer expires, the UE determines that it failed in the contention and may perform a random access process again or may notify a higher layer of the failure of the contention. In the latter method of the two contention resolution methods, that is, the method of sending the identity of a successful UE, is used if a UE does not have a unique cell identity prior to a random access process. That is, if the UE does not have its own cell identity, the UE includes an identity (or an S-TMSI or a random number) higher than the cell identity in data based on UL grant information included in a random access response, sends the data, and drives a collision resolution timer. If data including its own higher identity is transmitted through a DL-SCH before the collision resolution timer expires, the UE determines that the random access process was successful. In contrast, if data including its own higher identity is not received through a DL-SCH before the collision resolution timer expires, the UE determines that the random access process has failed.

Unlike in the contention-based random access procedure shown in FIG. 8, the operation in the non-contention-based random access procedure is terminated by only the transmission of the first message and the second message. In this case, before a UE sends a random access preamble to an eNB as the first message, the eNB allocates the random access preamble to the UE, and the UE sends the allocated random access preamble to the eNB as the first message and receives a random access response from the eNB. Accordingly, the random connection procedure is terminated.

The aforementioned contents of the random access procedure have been described based on the LTE/LTE-A system and are for convenience of description only and may be extended and applied to the 5G NR system in the same or similar manner.

As described above, in the 5G NR system (hereinafter referred to as an "NR system"), various use case scenarios and/or deployments in various frequency bands may be taken into consideration. Accordingly, in the NR system, methods of supporting various numerologies for each component carrier (CC) may be taken into consideration. In this case, the numerology may mean subcarrier spacing and a cyclic prefix (CP).

By taking this point into consideration, this specification proposes a method of supporting timing adjustment, that is, transmission/reception timing adjustment, in the carrier aggregation (CA) situation of an NR system in which numerology may be different for each CC and/or between CCs.

Timing advance (TA) described in this specification may mean a timing offset applied in a UE for synchronization between an uplink (UL) subframe and a downlink (DL) subframe in order for a base station to perform orthogonal DL/UL transmission and reception.

The NR system can support multiple timing advance groups (TAGs), that is, multiple TAGs, by taking into consideration the aforementioned CA deployment scenarios (e.g., the fourth CA deployment scenario (HetNet)). As described above, a TAG that belongs to TAGs and that includes a PCell may be denoted as a pTAG, and a TAG that belongs to TAGs and that includes only an SCell may be denoted as an sTAG.

In this case, initial timing information about an initial pTAG may be obtained through a random access procedure (RA procedure). Thereafter, timing information about an sTAG may be obtained through a contention-free RA procedure (or non-contention RA procedure) based on a PDCCH (or NPDCCH) order by taking into consideration the state in which a UE has set up an RRC connection (i.e., RRC_CONNECTED state).

Hereinafter, in this specification, a method of obtaining pTAG timing information, a method of obtaining sTAG timing information, a method of configuring a TA command, a method of configuring activation/re-activation timing of an SCell, and a method of determining a timing difference requirement are described in detail by taking into consideration a carrier aggregation (CA) operation in the aforementioned NR system.

First Embodiment

In the present embodiment, a method of obtaining pTAG timing information by taking into consideration a CA operation in the NR system is described.

In this case, a random access procedure (hereinafter referred to as an "RA procedure") may be used as the method of obtaining pTAG timing information by taking into consideration a CA operation in the NR system.

Specifically, in order to obtain TA information about a pTAG, it is necessary to perform an RA procedure from the beginning of the transmission of a random access preamble (hereinafter referred to as an "RA preamble") to a PCell. In this case, a contention-based RA procedure or a contention-free RA procedure may be used as an RA procedure for obtaining TA information about a pTAG.

In the case of a CA operation in the NR system, since numerology of each component carrier (CC) may be selected from among various values (e.g., subcarrier spacings 15 kHz, 30 kHz, 60 kHz, and 120 kHz), a difference between the various values may need to be taken into consideration. For example, the length of a symbol, a slot and/or a subframe may be differently set based on a difference between subcarrier spacings. A difference, such as differently set transmission timing or counter size in each step may need to be taken into consideration.

Hereinafter, regarding a procedure of obtaining pTAG timing information, a method 1-1) using a contention-based RA procedure and a method 1-2) using a contention-free RA procedure are described in detail. Method 1) and method 2) have been divided for convenience of description only, and they may be applied by combining them or substituting some elements.

Method 1-1)

First, a method of obtaining pTAG timing information using a contention-based RA procedure is described.

In the contention-based RA procedure, when a base station (e.g., gNB) successfully receives a preamble (i.e., the aforementioned Msg 1) transmitted by a UE in a first step, it may transmit an RAR message (i.e., a message in a second step, that is, the aforementioned Msg 2) to the UE within a random access response (RAR) window that starts after a specific time from the transmission start point (e.g., n-th subframe) of a preamble. In this case, the start point and end point of the RAR window may be configured in a subframe and/or slot unit.

For example, the RAR window may be configured to start in an (n+k0)-th subframe. In this case, n may be the transmission start subframe of a preamble or may correspond to the last subframe. In this case, an absolute time corresponding to k0 may be scaled (i.e., expanded or reduced based on a specific condition/value) based on numerology of a CC. Accordingly, a preparation time for RAR transmission in a base station is insufficient or a disadvantage may occur in the latency or power aspect because the preparation time is excessively increased.

In order to solve this problem, a k0 value may be configured as an absolute time or RAR window timing may be configured in a symbol, slot and/or subframe unit configured in association with numerology or independently. In this case, the set value may be applied to all of numerologies in common or may be differently applied for each numerology. For example, the aforementioned method of configuring RAR window timing in association with numerology may be a method of interpreting an RAR window start point as a k0*M subframe by taking into consideration that the length of a subframe is reduced to 1/M when subcarrier spacing is increased M times.

Alternatively, for another example, a configuration may be performed so that an RAR message (i.e., Msg 2) transmitted from a base station to a UE is transmitted in an (n+k1)-th subframe within an RAR window. In this case, n may be the transmission start subframe of a preamble or may correspond to the last subframe. A k1 value may be configured as an absolute time or RAR window timing may be configured in a symbol, a slot and/or a subframe unit configured in association with numerology or independently. As in the example, the set value may be applied to all of numerologies in common or may be differently applied for each numerology. For example, the aforementioned method of configuring RAR transmission timing in association with numerology may be a method of interpreting an RAR transmission start point as a k1*M subframe by taking into consideration that the length of the subframe is reduced to 1/M when subcarrier spacing is increased M times.

A UE may transmit the message (i.e., the aforementioned Msg 3) of a third step after a specific time from an RAR reception subframe (i.e., a subframe in which an RAR has been received). For example, assuming that the RAR reception subframe is an n-th subframe, the UE may be configured to transmit the message of the third step in an (n+k2)-th subframe.

In this case, as in the aforementioned k0 and/or k1, a k2 value may be configured as an absolute time or window timing for the message of the third step may be configured in a symbol, a slot and/or a subframe unit configured in association with numerology or independently. As in the example, the set value may be applied to all of numerologies in common or may be differently applied for each numerology. For example, the aforementioned method of configuring transmission timing for Msg 3 in association with numerology may be a method of interpreting a transmission start point for Msg 3 as a k2*M subframe by taking into consideration that the length of the subframe is reduced to 1/M when subcarrier spacing is increased M times.

Method 1-2)

A method of obtaining pTAG timing information using a contention-free RA procedure is described below.

When a UE receives information about a PDCCH order (PDCCH order) from a base station (e.g., gNB), the UE may transmit the message (i.e., Msg 1) of a first step through a PDCCH resource generated (or assigned) after a specific time from a subframe (e.g., an n-th subframe) to which a PDCCH order belongs. In this case, a minimum value of transmission timing of the message (i.e., transmission timing of Msg 1) of the first step may be configured in a subframe unit.

For example, the UE may be configured to transmit a preamble through a PRACH resource at the earliest point of time that starts from an (n+k0)-th subframe or thereafter. Since a subframe length is differently set based on numerology of a CC, an absolute time corresponding to k0 is scaled (i.e., expanded or reduced based on a specific condition/value). Accordingly, a preparation time for the transmission of a preamble in the UE is insufficient or a disadvantage may occur in the latency or power aspect because the preparation time is excessively increased.

In order to solve this problem, a k0 value is configured (or set) as an absolute time or may be configured in a symbol, a slot and/or a subframe unit configured in association with numerology or independently. In this case, the configured value may be applied to all of numerologies in common or may be differently applied for each numerology. For example, the aforementioned method of configuring a k0 value in association with numerology may be a method of interpreting the start point of message (i.e., Msg 1) transmission of a first step as a k0*M subframe by taking into consideration that when subcarrier spacing is increased M times, the length of the subframe is reduced to 1/M.

As in Method 1), even in Method 2), an RAR window configuration and RAR transmission timing may be configured as an absolute time or may be configured in a symbol, a slot and/or a subframe unit configured in association with numerology or independently. In this case, the configured value may be applied to all of numerologies in common or may be differently applied for each numerology.

Furthermore, as in Method 1), even in Method 2), transmission timing of the message of a third step (i.e., Msg 3) may be configured as an absolute time or may be configured in a symbol, a slot and/or a subframe unit configured in association with numerology or independently. Even in this case, the configured value may be applied to all of numerologies in common or may be differently applied for each numerology.

Second Embodiment

In the present embodiment, a method of obtaining sTAG timing information by taking into consideration a CA operation in the NR system is described.

As in the first embodiment, an RA procedure may be used as the method of obtaining sTAG timing information by taking into consideration a CA operation in the NR system.

Specifically, after a UE performs timing adjustment (in particular, uplink timing adjustment) through an RA procedure for a PCell belonging to a pTAG, it may enter an RRC connection setup state (RRC_CONNECTED state). Thereafter, an SCell may be activated through an SCell addition procedure for a configured SCell. In this process, a base station (e.g., gNB) may signal the UE as to which the SCell belongs to the pTAG or an sTAG.

If the SCell belongs to a pTAG, it may share the same TA command with the PCell. If not, that is, the SCell belongs to an sTAG, the UE may perform an RA procedure for the activated SCell in order to obtain timing information about the sTAG.

In this case, the RA procedure performed by the UE may be initiated when the base station transmits a PDCCH order because the corresponding UE is already in the RRC connection setup state. In this case, the PDCCH order may be for an SCell that wants to obtain timing information or another activated SCell (i.e., scheduled SCell) that belongs to the same sTAG as the corresponding SCell.

A case where a UE receives a PDCCH order from an SCell that transmits a preamble (i.e., RA preamble) may be assumed by taking into consideration the PDCCH order according to self-carrier scheduling.

In this case, when the UE receives the PDCCH order from a base station, the UE may transmit the message (i.e., Msg 1) of a first step through a PDCCH resource generated (or assigned) after a specific time from a subframe (e.g., n-th subframe) to which the PDCCH order belongs. In this case, a minimum value of transmission timing of the message (i.e., transmission timing for Msg 1) of the first step may be configured in a subframe unit.

For example, a UE may be configured to transmit a preamble through a PRACH resource at the earliest point of time that starts from an (n+k0)-th subframe or thereafter.

Furthermore, for a reason similar to that of Method 2) of the first embodiment, a k0 value may be configured as an absolute time or may be configured in a symbol, a slot and/or a subframe unit configured in association with numerology or independently. In this case, the set value may be applied to all of numerologies in common or may be differently applied for each numerology. For example, the aforementioned method of setting a k0 value in association with numerology may be a method of interpreting the start point of message (i.e., Msg 1) transmission of the first step as a k0*M subframe by taking into consideration th at the length of a subframe is reduced to 1/M when subcarrier spacing is increased M times.

As in the case of Method 1) of the first embodiment, even in this case, an RAR window configuration and RAR transmission timing may be configured as an absolute time or may be configured in a symbol, a slot and/or a subframe unit configured in association with numerology or independently. In this case, the set value may be applied to all of numerologies in common or may be differently applied for each numerology.

Furthermore, as in the case of Method 1) of the first embodiment, even in this case, transmission timing of the message (i.e., Msg 3) of the third step may be configured as an absolute time or may be configured in a symbol, a slot and/or a subframe unit configured in association with numerology or independently. In this case, the set value may be applied to all of numerologies in common or may be differently applied for each numerology.

In order to obtain TA information about an sTAG, a UE may determine the timings (e.g., Msg 1 transmission timing, RAR window timing, RAR transmission timing and Msg 3 transmission timing) of the steps through an RA procedure for a PCell before it performs an RA procedure on an SCell. Accordingly, in this case, timing in each step of an RA procedure for a pTAG may be identically applied to the RA procedure for the SCell. Alternatively, the UE may configure and use timing in each step separately from the PCell according to the aforementioned method. Alternatively, timing in each step of the RA procedure for the pTAG may be applied identically conditionally if the numerologies of an SCell and a PCell that want to obtain TA information are the same or correspond to a specific combination.

Third Embodiment

In the present embodiment, a method of configuring a TA command by taking into consideration a CA operation in the NR system is described.

First, an initial timing adjustment procedure in the NR system may be performed as follows.

A base station estimates initial TA from a preamble (i.e., RA preamble) transmitted by a UE and may then transmit a TA command to the UE in a next step (i.e., RAR transmission step). Thereafter, the UE may transmit a message (i.e., Msg 3) by adjusting the message (i.e., Msg 3) transmission timing of a third step to the initial TA received through the TA command, and may enter (or reach) an RRC connection setup state through the remaining RA procedure.

If the UE enters the RRC connection setup state, TA tracking may be performed through a specific uplink signal (e.g., a PUSCH, a PUCCH or an SRS). In this case, the TA tracking may mean an operation of determining whether TA needs to be modified or updated based on the uplink signal transmitted by the UE.

If it is determined that modification or update for the TA needs to be necessary, the base station may instruct the UE to perform TA modification (or correction or update) by transmitting a TA command medium access control-control element (MAC-CE) to the UE. In this case, the TA command MAC-CE may mean a message configured to transmit the TA command in the MAC layer.

In this case, the time (i.e., offset) from timing when the UE has received the TA command to timing when the UE first corrects the TA in an uplink subframe (or slot) using a received TA value may be configured in a subframe unit (or slot unit). For example, if the U receives the TA command in an n-th subframe, the UE may be configured to perform uplink transmission by incorporating a TA command received in an (n+k)-th subframe. The subframe unit can be scaled (i.e., expanded or reduced) according to subcarrier spacing. Accordingly, timing into which the TA command is incorporated may be configured as an absolute time or may be configured in a symbol, a slot and/or a subframe unit configured in association with numerology or independently. The TA command may be configured taking into consideration a maximum supportable radius of a cell and control (e.g., control resolution) within a cyclic prefix (CP).

Specifically, the TA command in the NR system may be configured using at least one of the following method 3-1) to method 3-3). In this case, the method 3-1) to method 3-3) have been classified for convenience of description and may be applied by combining them or substituting some elements.

For reference, since a cell may be assigned to a specific frequency resource region, a frequency resource region described in the present embodiment may be interpreted as a concept corresponding to a cell. For example, in this specification, numerology of a specific cell may be the same as numerology configured in a specific frequency resource region.

Furthermore, in the present embodiment, the unit of a TA command may mean a TA value indicated by a TA command or the unit of a corresponding value, and may mean a unit in which a TA command is instructed or interpreted for a UE.

Method 3-1)

First, the unit of a TA command may be configured as an absolute time (e.g., microseconds (us), etc.). That is, a TA value or the unit of a TA value indicated by a TA command may be represented as an absolute time.

In this case, a maximum TA value (this may have a correlation with the size of TA) may be set as a fixed value. Furthermore, a corresponding method may be identically applied to all of numerologies.

Method 3-2)

Next, the unit of a TA command may be interpreted in association with numerology of a frequency resource region (e.g., cell, Component Carrier (CC), etc.) to which TA will be applied. That is, the TA command may be (scaled and) interpreted based on numerology of a frequency resource region to which the corresponding TA will be applied.

In this case, a maximum TA value (this may be related to the size of the TA) may be set as a fixed value or may be set by a base station. In the case of a method for a base station to set a maximum TA value, the maximum TA value may be delivered as system information (SI) through broadcast information (e.g., system information block (SIB)).

For example, the corresponding method may mean a method of interpreting the value of TA indicated by a TA command by scaling (i.e., expanding or reducing) the value based on subcarrier spacing.

Method 3-3)

Next, the unit of a TA command is determined by a base station, and information about a TA command may be broadcasted through system information (e.g., system information block). That is, the unit of a TA command may be configured by a base station, and information about the unit of a TA command may be delivered through a system information block.

In this case, a maximum TA value (this may have a correlation with the size of TA) may also be set by a base station or may be set as a fixed value. In the corresponding method, the system information block may be implicitly indicated through a PRACH format configuration.

In the following examples, the selection or application of Method 3-1) to Method 3-3) may be differently taken into consideration.

For example, the case of TA in an RAR received in an initial random access procedure is described below. In this case, Method 3-1) may be applied because a base station cannot assume that a UE is now in which state (e.g., RRC setup connection state). Alternatively, Method 3-2) that is operating or based on a specific numerology (e.g., reference numerology) may be applied.

That is, in the case of the initial RA procedure, a method of configuring an absolute time and/or a method of configuring a TA command based on numerology, in particular, numerology of a frequency resource region (e.g., a frequency domain corresponding to a specific cell) to which corresponding TA will be applied with respect to a TA command may be applied.

For another example, the case of TA in an MAC-CE received for uplink sync adjustment in the state in which a UE has been connected (e.g., RRC connection setup state) is described below. In this case, Method 3-2) into which numerology is incorporated may be applied because a base station can be aware that the state of the UE is in the RRC connection setup state. Alternatively, Method 3-3) may be applied for the flexibility of a TA command configuration.

That is, if a UE has already completed RRC connection setup with a base station, a TA command transmitted by the base station may be interpreted based on numerology of a frequency resource region to which the corresponding TA will be applied. In this case, if the TA is applied for the update of previously configured uplink timing (e.g., uplink sync adjustment based on TA tracking), a TA command indicated by the corresponding TA may be delivered to the UE through a MAC-CE.

For another example, the case of TA in an RAR received in an RA procedure having an object of a scheduling request (SR) in the state in which a UE has been connected (e.g., RRC connection setup state) is described. In this case, Method 3-1) may be applied because a base station cannot assume that the UE is now in which state (e.g., RRC setup connection state). Alternatively, Method 3-2) is applied based on an operating or specific numerology (e.g., reference numerology).

For another example, the case of TA in an RAR received in an RA procedure (e.g., a contention-free RA procedure) based on a PDCCH order is described. In this case, Method 3-2) in which numerology is taken into consideration may be applied because a base station can be aware that the state of a UE is in an RRC connection setup state. Alternatively, Method 3-3) may be applied for the flexibility of a TA command configuration.

Furthermore, a method of configuring a TA command (i.e., the unit of a TA command) and/or a maximum TA value (this may have a correlation with the size of TA) if a base station is aware of numerology of a UE (i.e., numerology applied for the UE to perform uplink transmission) (e.g., in the case of the first example and/or the second example) is described in detail.

In this case, if numerology between frequency resource regions (e.g., cells) configuring a TAG is different, a TA command and/or a maximum TA value may be configured based on a specific numerology (e.g., the largest subcarrier spacing) belonging to the TAG. That is, if the TAG consists of multiple numerologies, the TA command and/or maximum TA value for the corresponding TAG may be configured or interpreted based on a specific numerology configuring the corresponding TAG. Such a method may be performed as in a next example.

For example, if Method 3-2) or Method 3-3) is selected and applied, a method of configuring a TA command and/or maximum TA value based on a specific subcarrier spacing belonging to a TAG may be taken into consideration. That is, a reference for configuring or interpreting the range of a TA command may be configured as a specific one of multiple subcarrier spacings belonging to a corresponding TAG.

In particular, the unit of a TA command may be configured as the largest subcarrier spacing unit and/or a maximum TA value may be configured as a minimum subcarrier spacing unit. In this case, the largest subcarrier spacing and the minimum subcarrier spacing may mean a maximum value and minimum value of subcarrier spacings of multiple resource regions respectively configuring corresponding TAGs.

In the existing LTE system, only a 15 kHz subcarrier spacing is supported and the unit of a TA command has been fixed to 16 Ts (in this case, 1 Ts=1/(30.72 MHz)~=0.0325 us). For this reason, the ratio of the unit of a TA command and a CP length is 16/144=1/9 by taking into consideration the length 144 Ts (or 160 Ts) of normal CP of the LTE system. Accordingly about 9 TA command units are present within a normal CP. For example, if the TA command unit 16 Ts of the LTE system is applied to a case where the subcarrier spacings of frequency resource regions (e.g., cells) configuring a TAG in the NR system are 15 kHz and 60 kHz, respectively, without any change, the CP length of a TA command is reduced to ¼ in the 16 Ts state in a frequency resource region using the 60 kHz subcarrier spacing. In this case, the ratio of the TA command unit and the CP length becomes 16/(144/4)=4/9. Accordingly, only a TA adjustment unit of about 2 is present within a CP, and thus fine adjustment of TA is practically impossible.

In particular, if frequency resource regions (e.g., cells) using subcarrier spacings of 15 kHz and 120 kHz are present within the same TAG, a problem may become more serious. In the case of a frequency resource region (e.g., cell) using the 120 kHz subcarrier spacing, TA adjustment itself is practically impossible because 1 TA adjustment unit is present within a CP.

In order to supplement this problem, TA fine adjustment of at least LTE system level can be supported with respect to all of frequency resource regions (e.g., cells) configuring a TAG regardless of numerology by configuring the aforementioned TA command (i.e., TA command unit) as the largest subcarrier spacing unit. For example, about 9 TA command units may be configured to be present within a CP length through such a method.

Meanwhile, the CP length is in reverse proportion to a subcarrier spacing if CP overhead is the same. The reason for this is that a CP length also increases in reverse proportion to a subcarrier spacing if CP overhead (i.e., a ratio of a CP length and an OFDM symbol valid period) is constant because the length of valid period of an OFDM symbol is in reverse proportion to the subcarrier spacing.

Accordingly, if numerologies of frequency resource regions (e.g., cells) configuring a TAG are different as described above, in order for a TA command to express up to the CP range of a frequency resource region (e.g., cell) having a minimum subcarrier spacing, a maximum TA value may be set based on a minimum subcarrier spacing of a frequency resource region (e.g., cell) configuring a TAG. For example, if different cell ranges are supported through different subcarrier spacings in the same site (e.g., if a minimum subcarrier spacing is used for services supporting a maximum cell range or if the largest subcarrier spacing is used for services supporting a minimum cell range), the same TAG may be configured due to the same site. In this case, in order to support up to service supporting maximum cell range using the same TA command, a maximum TA value may be configured based on the minimum subcarrier spacing.

Furthermore, if an uplink signal that induces TA (i.e., an uplink signal that generates TA adjustment) is explicitly defined, a TA command (i.e., TA command unit) and/or a maximum TA value may be determined based on the subcarrier spacing of a component carrier (CC) that has transmitted the corresponding signal.

For example, in order for a base station to determine TA, a transmitted uplink signal may be previously configured or defined. In the state in which a corresponding uplink signal(s) has been configured for each frequency resource region (e.g., cell) or for each TAG, a TA command (i.e., TA command unit) and a maximum TA value may be configured to be determined based on the subcarrier spacing of a configured uplink signal or an actually transmitted uplink signal of configured uplink signals. Such a method has an advantage in that the size of a TA command field can be optimized compared to a method of configuring a TA command unit based on the largest subcarrier spacing of multiple subcarrier spacings configuring a corresponding TAG and determining a maximum TA value based on a minimum subcarrier spacing. That is, this method has an advantage in the overhead reduction aspect of a TA command field.

Furthermore, a TA command (i.e., TA command unit) and/or a maximum TA value may be determined based on the subcarrier spacing of a component carrier (CC) used by a base station when it transmits an (N)PDCCH order.

An RA procedure based on an (N)PDCCH order is an operation in the RRC connection setup state and is a method for a base station to instruct a specific UE to perform an RA procedure on a specific frequency resource region (e.g., cell). Accordingly, there is an advantage in that the size of a TA command field can be optimized because a TA command unit and a maximum TA value are configured based on the subcarrier spacing of a corresponding frequency resource region (e.g., cell), compared to a method of configuring a TA command unit based on the largest subcarrier spacing and determining a maximum TA value based on a minimum subcarrier spacing. That is, there is an advantage in the overhead reduction aspect of a TA command field.

Furthermore, in the present embodiment, if up to a maximum radius of a cell is supported based on an initial TA command and adjustment finer than that of the initial TA command is to be supported using a tracking TA command, the bit field sizes of the initial TA command and the tracking TA command may be differently set or a minimum adjustment unit may be differently configured.

For example, in the case of a tracking TA command, a maximum adjustment range may be configured smaller than the case of an initial TA command and a minimum adjustment unit may be configured smaller than the case of an initial TA command. Alternatively, for the aforementioned purpose, bit fields of the same size or different sizes may be configured to be differently interpreted depending on an initial TA command or a tracking TA command. Alternatively, for the aforementioned object, information configured by a base station may be broadcasted as system information or may be implicitly delivered through a PRACH format configuration.

Furthermore, a TA adjustment unit (e.g., Ts" or Tc") practically applied by a UE may be determined according to the following methods.

First, Ts may be determined based on a maximum bandwidth that may be configured in a corresponding frequency band. Thereafter, a TA reference adjustment unit Ts' (or Tc') may be determined based on the determined Ts (or Tc). For example, Ts' may be expressed as k*Ts. In this case, k may be determined based on an operating or specific (reference) numerology (e.g., a specific subcarrier spacing or a specific CP).

When Ts' is determined, an actual TA adjustment unit of a UE may be determined based on a relation with the operating or specific (reference) numerology. In this case, the TA adjustment unit Ts" of the UE may be expressed as m*Ts' (i.e., m*k*Ts). In this case, m may mean a reference subcarrier spacing/UE subcarrier spacing if only a subcarrier spacing is taken into consideration. For example, if the reference subcarrier spacing is 15 kHz and the UE subcarrier spacing is 60 kHz, m may be ¼.

Alternatively, if numerology between frequency resource regions (e.g., cells) configuring a TAG is different, a TA command may be configured as a combination of numerologies belonging to the TAG. For example, if a TA adjustment unit of a E having a first subcarrier spacing is Ts_1 and a TA adjustment unit of a UE having a second subcarrier spacing is Ts_2, a TA command may be configured in the form of a*Ts_1+b*Ts_2.

Fourth Embodiment

In the present embodiment, a method of configuring the activation or reactivation timing of an SCell in the NR system is described.

In a CA operation in an NR system, one SCell or some or all of multiple-configured SCells not used by a UE may be deactivated in order to reduce power. A method of activating the one SCell or some or all of the multiple-configured SCells again if the corresponding UE requires the one SCell or some or all of the multiple-configured SCells may be taken into consideration.

Upon activation or reactivation of an SCell, when a UE receives an activation or deactivation indication in a specific subframe (e.g., n-th subframe) (through MAC-CE) from a base station, the UE may be configured to start the deactivation timer (i.e., SCellDeactivationTimer) of the SCell after a specific time from the reception of the activation or deactivation indication or to restart the deactivation timer in the case of reactivation. In this case, the start point of the corresponding timer may be configured in a subframe or slot unit. For example, the corresponding timer may be configured to start or restart in an (n+k3)-th subframe.

Specifically, in the NR system, referring to the diversity of numerology and/or the support of the subcarrier spacing of a great value, the following methods 4-1) to 4-3) may be taken into consideration when the start or restart timing of the deactivation timer of an SCell is configured.

In this case, the start or restart timing of the deactivation timer of an SCell may include SRS transmission timing, CSI reporting timing, PDCCH monitoring timing and/or power headroom report (PHR) triggering timing after SCell (re) activation.

Method 4-1)

First, timing related to the activation or reactivation of an SCell may be configured as an absolute time (e.g., microseconds (us), etc.). In this case, Method 4-1 may be identically applied to all of numerologies.

Method 4-2)

Next, timing related to the activation or reactivation of an SCell may be interpreted in association with the numerology of a corresponding cell (i.e., the frequency resource region of a corresponding cell). In this case, the value of the corresponding timing may be scaled based on subcarrier spacing and interpreted.

Method 4-3)

Next, timing related to the activation or reactivation of an SCell may be determined by a base station, and corresponding information may be broadcasted through system information (e.g., system information block). That is, a base station may configure timing related to the activation or reactivation of an SCell and broadcast the timing through a system information block.

Fifth Embodiment

In the present embodiment, a method of determining a requirement for a timing difference in the NR system is described.

In a CA operation in the NR system, when the cell radius of a network and/or the number of TAGs are determined, the cell radius and the number of TAGs may be configured to be limited by taking into consideration the buffer size of a receiver. To this end, a requirement for a timing difference that may be tolerated by a UE needs to be configured. When a cell radius and/or the number of TAGs are determined, such a requirement may be taken into consideration.

When a requirement for a timing difference is determined, a maximum receiver bandwidth and a cyclic prefix (CP) that may be configured in a corresponding frequency band may need to be taken into consideration. The reason for this is that if the same UE buffer size is assumed, delay that may be tolerated when control information is more delayed than data in the downlink and reaches a UE may be reduced because data throughput increases as a receiver bandwidth becomes greater and a CP becomes smaller. Furthermore, since a UE buffer size is related to UE capability, the number of TAGs supportable by a corresponding UE may be limited depending on the UE buffer size or UE capability.

Furthermore, a method of restricting cross-carrier scheduling by taking into consideration a burden of a receiver buffer size for a scheduled cell and/or HARQ latency for a scheduled cell may also be taken into consideration.

For example, cross-CC scheduling between two component carriers (CCs) in which a TA difference exceeds "X us" and/or a difference between subcarrier spacings exceeds "Y times" may not be permitted. Specifically, cross-CC scheduling between two CCs in which a difference between the TA of a scheduling cell and the TA of a scheduled cell exceeds "X us" and/or the subcarrier spacing of a scheduling cell is "Y times" than the subcarrier spacing of a scheduled cell may not be permitted.

Figure 9:
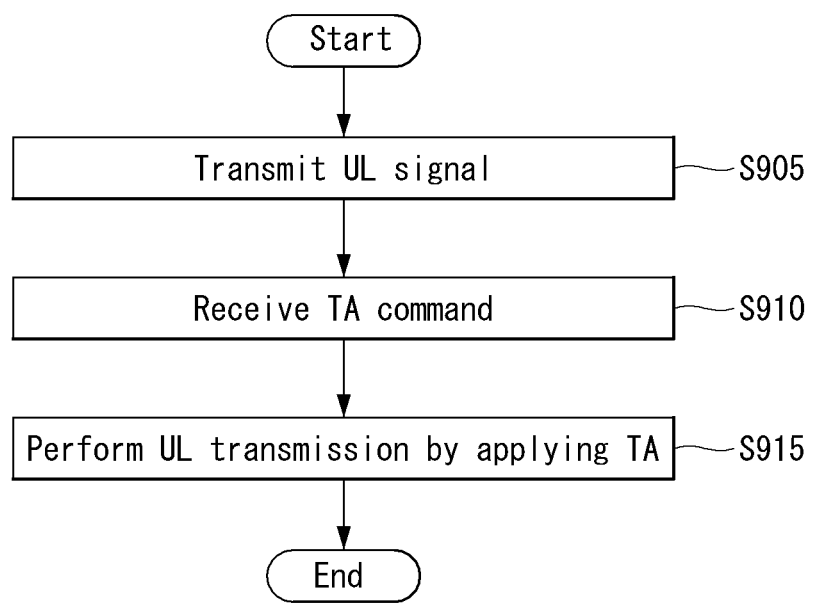
FIG. 9 illustrates a flowchart of an operation of a UE for adjusting uplink timing in a wireless communication system to which a method proposed in this specification may be applied.

FIG. 9 illustrates a flowchart of an operation of a UE for adjusting uplink timing in a wireless communication system to which a method proposed in this specification may be applied. FIG. 9 is for convenience of description only and does not limit the scope of the present invention.

Referring to FIG. 9, it is assumed that the UE supports a carrier aggregation (CA) operation in the NR system and operates based on the aforementioned embodiments of this specification. For example, in FIG. 9, the UE may be configured to adjust uplink timing (i.e., uplink transmission timing) based on the TA command configuration method described in the third embodiment.

The UE may transmit an uplink signal (e.g., the aforementioned RA preamble, PUCCH, PUSCH or SRS, etc.) to a base station (step S905).

The UE may receive a TA command configured based on the uplink signal, transmitted by the UE, from the base station (step S910). For example, the TA command may be configured based on the aforementioned method (e.g., the third embodiment).

The UE that has received the TA command may perform uplink transmission by applying TA indicated by the TA command (step S915).

In this case, the TA command may be interpreted based on the subcarrier spacing of at least one frequency resource region (e.g., a frequency resource region corresponding to a cell) to which the TA will be applied.

The UE may further receive information about a TAG from the base station. This operation may be performed before the TA command is received from the base station. In this case, the TA command received by the UE may be a TA command corresponding to a TAG indicated by the base station.

If the aforementioned uplink signal is an RA preamble, the TA command may be included in an RAR (i.e., RAR message) transmitted by the base station as a response to the preamble.

Alternatively, if corresponding TA is applied for the update of uplink timing previously configured or indicated in a UE, a TA command may be received through a MAC-CE. In this case, the state in which a radio resource control (RRC) connection has been set up with a UE may be assumed.

Furthermore, as in the aforementioned method, a TA command may be configured based on the largest subcarrier spacing of the subcarrier spacings of frequency resource regions (e.g., a frequency resource region corresponding to a cell) configuring a TAG. Furthermore, a maximum TA value indicated by a TA command may be configured based on a minimum subcarrier spacing of the subcarrier spacings of frequency resource regions configuring a TAG. Furthermore, an offset between reception timing of a TA command and timing when uplink transmission is performed by applying the TA command may be configured in a subframe or slot unit based on subcarrier spacing.

General apparatus to which the present invention may be applied

Figure 10:
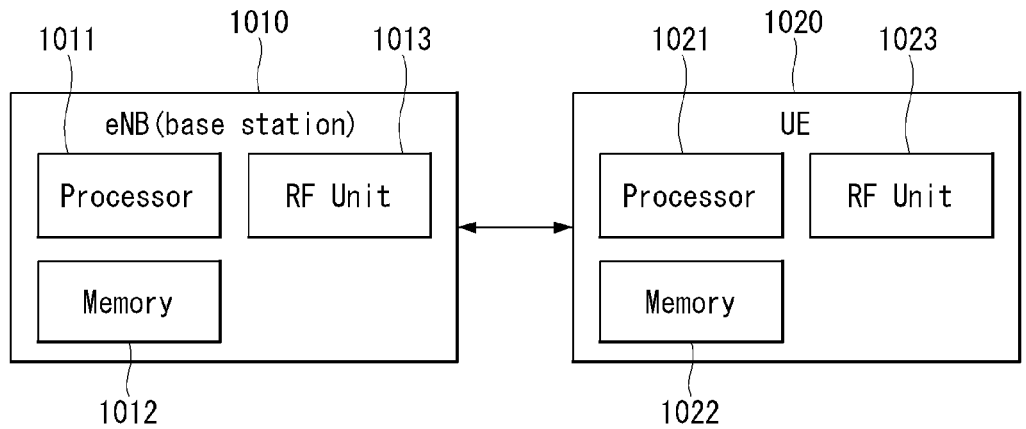
FIG. 10 illustrates a block diagram of a wireless communication apparatus according to an embodiment of the present invention.

FIG. 10 illustrates a block diagram of a wireless communication apparatus according to an embodiment of the present invention.

Referring to FIG. 10, the wireless communication system includes a base station (eNB) 1010 and a user equipment (UE) 1020.

The eNB 1010 includes a processor 1011, a memory 1012 and communication module 1013.

The processor 1011 implements the functions, processes and/or methods proposed in FIGS. 1 to 9 above. The layers of wireless interface protocol may be implemented by the processor 1011. The memory 1012 is connected to the processor 1011, and stores various types of information for driving the processor 1011. The communication module 1013 is connected to the processor 1011, and transmits and/or receives radio signals.

The communication module 1013 includes radio frequency unit (RF unit) for transmitting and receiving radio signal.

The UE 1020 includes a processor 1021, a memory 1022 and a communication module (or radio frequency unit) 1823. The processor 1021 implements the functions, processes and/or methods proposed in FIGS. 1 to 9 above. The layers of wireless interface protocol may be implemented by the processor 1021. The memory 1022 is connected to the processor 1021, and stores various types of information for driving the processor 1021. The communication module 1023 is connected to the processor 1021, and transmits and/or receives radio signals.

The memories 1012 and 1022 may be located interior or exterior of the processors 1011 and 1021, and may be connected to the processors 1011 and 1021 with well known means.

In addition, the eNB 1010 and/or the UE 1020 may have a single antenna or multiple antennas.

Figure 11:
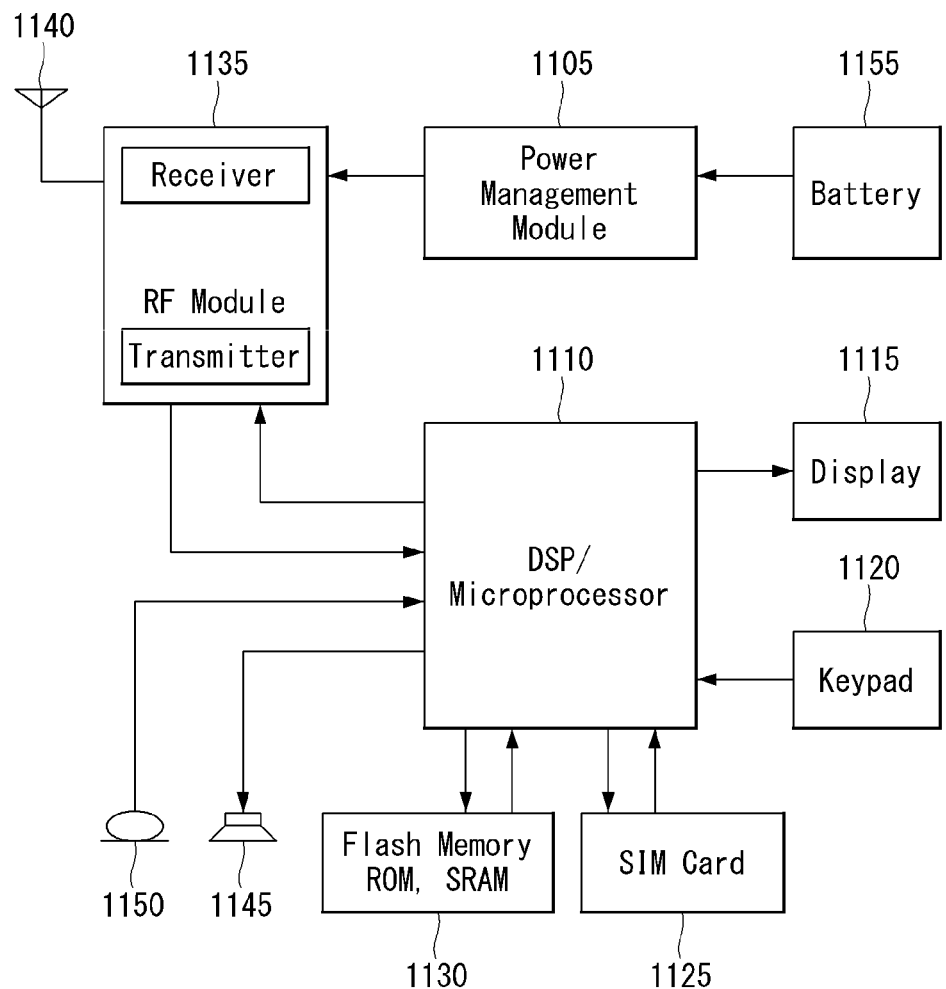
FIG. 11 illustrates a block diagram of a communication apparatus according to an embodiment of the present invention.

FIG. 11 is a block diagram of a communication device according to an embodiment of the present disclosure.

Particularly, FIG. 11 is a diagram illustrating a UE shown in FIG. 10 in more detail.

Referring to FIG. 11, the UE includes a processor (or digital signal processor (DSP)) 1110, an RF module (or RF unit) 1135, a power management module 1105, an antenna 1140, a battery 1155, a display 1115, a keypad 1120, a memory 1130, a subscriber identification module (SIM) card 1125 (optional), a speaker 1145 and a microphone 1150. The UE may include a single antenna or multiple antennas.

The processor 1110 may be configured to implement the functions, procedures and/or methods proposed by the present disclosure as described in FIGS. 1 to 9. Layers of a wireless interface protocol may be implemented by the processor 1110.

The memory 1130 is connected to the processor 1110 and stores information related to operations of the processor 1110. The memory 1130 may be located inside or outside the processor and may be connected to the processors through various well-known means.

A user enters instructional information, such as a telephone number, for example, by pushing the buttons of a keypad 1120 or by voice activation using the microphone 1150. The processor receives and processes the instructional information to perform the appropriate function, such as to dial the telephone number. Operational data may be retrieved from the SIM card 1125 or the memory 1130 to perform the function. Furthermore, the processor may display the instructional and operational information on the display 1115 for the user's reference and convenience.

The RF module 1135 is connected to the processor and transmits and/or receives an RF signal. The processor forwards instructional information to the RF module, to initiate communication, for example, transmits radio signals comprising voice communication data. The RF module includes a receiver and a transmitter to receive and transmit radio signals. An antenna 1140 facilitates the transmission and reception of radio signals. Upon receiving radio signals, the RF module may forward and convert the signals to baseband frequency for processing by the processor. The processed signals may be transformed into audible or readable information outputted via the speaker 1145.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

The method of adjusting uplink timing in a wireless communication system according to the present invention has been described based on an example in which the method is applied to the 3GPP LTE/LTE-A system and 5G, but may be applied to various wireless communication systems in addition to the example.

The embodiment of the present invention has an advantage in that uplink timing can be finely adjusted even in a wireless communication system supporting multiple numerologies (e.g., subcarrier spacings or cyclic prefixes).

Furthermore, the embodiment of the present invention has an advantage in that overhead of uplink timing adjustment can be reduced by optimizing the field size of a timing advance (TA) command.

It will be appreciated by those skilled in the art that the effects that can be achieved with the present invention are not limited to what has been described above and other advantages of the present invention will be clearly understood from the following detailed description taken in conjunction with the accompanying drawings.

What is claimed is:

1. A method for a user equipment to adjust uplink timing in a wireless communication system, the method comprising:
    transmitting, to a base station, a first uplink signal;
    receiving, from the base station, a first timing advance (TA) command configured based on the first uplink signal;
    transmitting, to the base station, a second uplink signal by applying a timing advance (TA) value based on the first TA command; and
    receiving, from the base station, a second TA command for updating the TA value,
    wherein the first TA command and the second TA command are configured based on a maximum subcarrier spacing, among subcarrier spacings of a plurality of frequency regions for the user equipment, and
    wherein a maximum value of the TA value is configured based on a minimum subcarrier spacing, among the subcarrier spacings.

2. The method of claim 1, wherein the plurality of frequency regions are included in a same timing advance group (TAG).

3. The method of claim 2, wherein the first uplink signal is a preamble for random access to the base station, and
    wherein the first TA command is included in a random access response transmitted by the base station as a response to the preamble.

4. The method of claim 2, wherein a field size for the TA value is configured based on the minimum subcarrier spacing.

5. The method of claim 2, wherein an offset between reception timing of the first TA command and transmission timing of the second uplink signal is configured in a slot unit according to the subcarrier spacing.

6. The method of claim 1, wherein the second TA command is received through a medium access control-control element (MAC-CE).

7. The method of claim 6, wherein a radio resource control connection has been set up in the user equipment, and
    wherein the second uplink signal is at least one of a physical uplink control channel, a physical uplink shared channel and a sounding reference signal.

8. A user equipment adjusting uplink timing in a wireless communication system, the user equipment comprising:
    a transceiver;
    at least one processor; and
    at least one computer memory operably connectable to the at least one processor and storing instructions that, when executed by the at least one processor, perform operations comprising:
    transmitting, to a base station, a first uplink signal;
    receiving, from the base station, a first timing advance (TA) command configured based on the first uplink signal;
    transmitting, to the base station, a second uplink signal by applying a timing advance (TA) value based on the first TA command; and
    receiving, from the base station, a second TA command for updating the TA value,
    wherein the first TA command and the second TA command are configured based on a maximum subcarrier spacing, among subcarrier spacings of a plurality of frequency regions for the user equipment, and
    wherein a maximum value of the TA value is configured based on a minimum subcarrier spacing, among the subcarrier spacings.

9. The user equipment of claim 8, wherein the plurality of frequency regions are included in a same timing advance group (TAG).

10. The user equipment of claim 9, wherein the first uplink signal is a preamble for random access to the base station, and
    wherein the first TA command is included in a random access response transmitted by the base station as a response to the preamble.

11. The user equipment of claim 8, wherein the second TA command is received through a medium access control-control element (MAC-CE).

* * * * *